US005391009A

United States Patent [19]
Stodder

[11] Patent Number: 5,391,009
[45] Date of Patent: Feb. 21, 1995

[54] SINGLE MOTOR ACTUATION FOR AUTOMATIC STACK FEEDER SYSTEM IN A HARDCOPY DEVICE

[75] Inventor: Samuel A. Stodder, Encinitas, Calif.

[73] Assignee: Hewlett-Packard Company, Palo Alto, Calif.

[21] Appl. No.: 144,943

[22] Filed: Oct. 29, 1993

[51] Int. Cl.6 ............................................. B41J 11/50
[52] U.S. Cl. ................................... 400/605; 101/232; 271/9; 271/110; 271/127; 400/625; 355/308
[58] Field of Search ............... 400/126, 624, 625, 605, 400/629; 101/232; 271/9, 110, 127, 128; 355/308, 309, 311, 313, 316

[56] References Cited

U.S. PATENT DOCUMENTS

| 4,212,456 | 7/1980 | Ruenzi | 271/127 |
| 4,299,380 | 11/1981 | Ogihara et al. | 271/9 |
| 4,522,882 | 6/1985 | Chu et al. | 400/605 |
| 4,566,684 | 1/1986 | Gysling | 271/127 |
| 4,570,919 | 2/1986 | Huang | 400/624 |
| 4,577,849 | 3/1986 | Watanabe | 271/9 |
| 4,667,947 | 5/1987 | Costa | 400/625 |
| 4,786,920 | 11/1988 | Igarashi | 271/9 |
| 5,002,266 | 3/1991 | Kikuchi et al. | 271/127 |
| 5,149,218 | 9/1992 | Iwatani et al. | 400/625 |
| 5,171,006 | 12/1992 | Naito | 400/629 |

Primary Examiner—Eugene H. Eickholt
Attorney, Agent, or Firm—David S. Romney

[57] ABSTRACT

A hardcopy device has various page processing steps in a printer, fax machine or the like which are actuated by a single motor which connects through a gear mechanism to drive a main drive roller, a pick roller, and automatically move a pressure plate in a feeder slot to and fro between a position of engagement holding a stack of pages against the pick roller and a position of disengagement. A reverse action of the pick roller kicks out partially picked pages into the feeder slot after the pressure plate is moved to a position of disengagement.

20 Claims, 13 Drawing Sheets

SINGLE MOTOR ACTUATION FOR AUTOMATIC STACK FEEDER SYSTEM IN A HARDCOPY DEVICE

BACKGROUND OF THE INVENTION

This invention relates generally to printers and facsimile machines, and more particularly to automatically feeding pages from a stack in a hardcopy device.

In printers and facsimile machines, it is very important to provide reliable and automatic feeding or "picking" of individual pages from an input stack into the paper path. It is equally important to provide a main drive roller for moving each page past a printing or scanning station to an output area.

Prior inexpensive printers typically used a single large diameter roller for picking the paper from a stack as well as for moving the paper past the printhead, as was used in previous DeskJet printers made by Hewlett-Packard Company. Many printers and facsimile machines often separate the paper picking function from the main drive roller function.

Some printers facilitate stack feeding by the use of springloaded trays which are usually removable for reloading of paper. Others printers such as the LaserJet Printers made by Hewlett-Packard Packard Company have complicated feeder/picking devices employing many parts in order to handle large quantity stacks of paper.

Most facsimile machines have a simplified picking scheme which provides very limited pressure at the leading edge of a several stacked pages placed in an automatic document feeder. This usually limits the number of pages in the stack to 5-10, with greater risk of misfeeds when putting more the a few pages in the stack.

Many printer devices have the capability of spacing apart successive pages which are picked from a stack, such as with timing devices, or the like.

There is a need to provide a more reliable, simplified low-cost integration of all of the aforementioned functions in order to assure satisfactory trouble-free operation of loading, picking, and moving pages along the paper path of printers and facsimile machines.

BRIEF SUMMARY OF THE INVENTION

It is an object of the present invention to create an integrated mechanical drive system in a hardcopy device by using a single motor for feeding, picking and processing successive pages from a large quantity stack with minimal risk of misfeeds. In particular, it is desirable to be able to handle automatically up to twenty-five pages in an input stack of documents to be scanned by a facsimile machine, and to handle automatically up to one hundred pages in an input stack of sheets to be printed by a printer device.

The invention contemplates spring-loaded feeder plate, a pick roller, a main drive roller, and where desirable an output roller which are all driven by a single motor. In a preferred form, the pick roller is driven at a first rate, the main drive roller is driven at a second rate greater than the first rate, and the output roller is driven at a third rate greater than the second rate.

The feeder plate is moved back and forth from an active position of engagement holding the stack against the pick roller to a passive position of dis-engagement allowing the stack to fall away from the pick roller. The change of position of the feeder plate is motor-actuated to allow alignment of an existing stack of paper, such as before each picking step, as well as to allow easy loading of additional pages in a feeder slot without having to manually actuate or remove any loading tray. Such additional pages may be placed on top of the existing stack, or may be used to replenish an empty stack or to replace an existing stack with a different type of sheet or document to be processed by the hardcopy device.

After the feeder plate is automatically moved to the disengagement position, the pick roller is automatically rotated in reverse to remove any pages already engaged by the pick roller. When the pick roller is being rotated in the forward direction during normal operation of the printer or fax machine, individual successive pages are spaced apart automatically by temporary deactivation of the pick roller.

DETAILED DESCRIPTION OF THE PREFERRED EMBODIMENTS

Generally speaking, the invention provides for picking pages from a stack of sheets in an input feeder for roller-driven movement along a first path through a printing station to an output, and for picking pages from a stack of documents in an input feeder for roller-driven movement along a second path through a scanning station to an output. Depending on the particular implementation, at least a portion of the first and second paths are commonly shared, and common mechanisms are used for various steps such as for picking, providing roller-driven movement through the processing stations, and for actuating a pressure plate in the input feeders.

Figure 1:
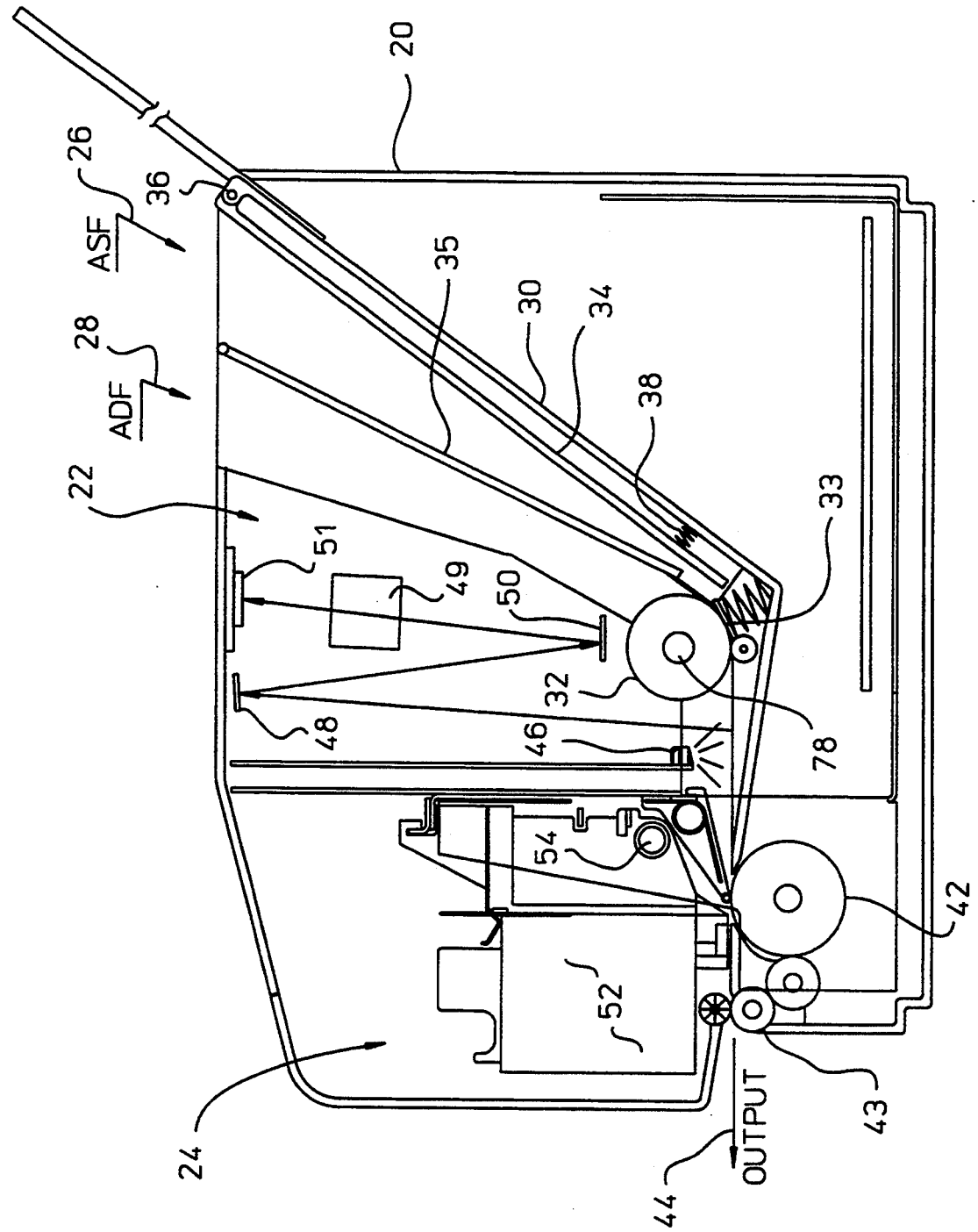
FIG. 1 is a schematic side view of a presently preferred printer/facsimile embodiment of the present invention.
Figure 2:
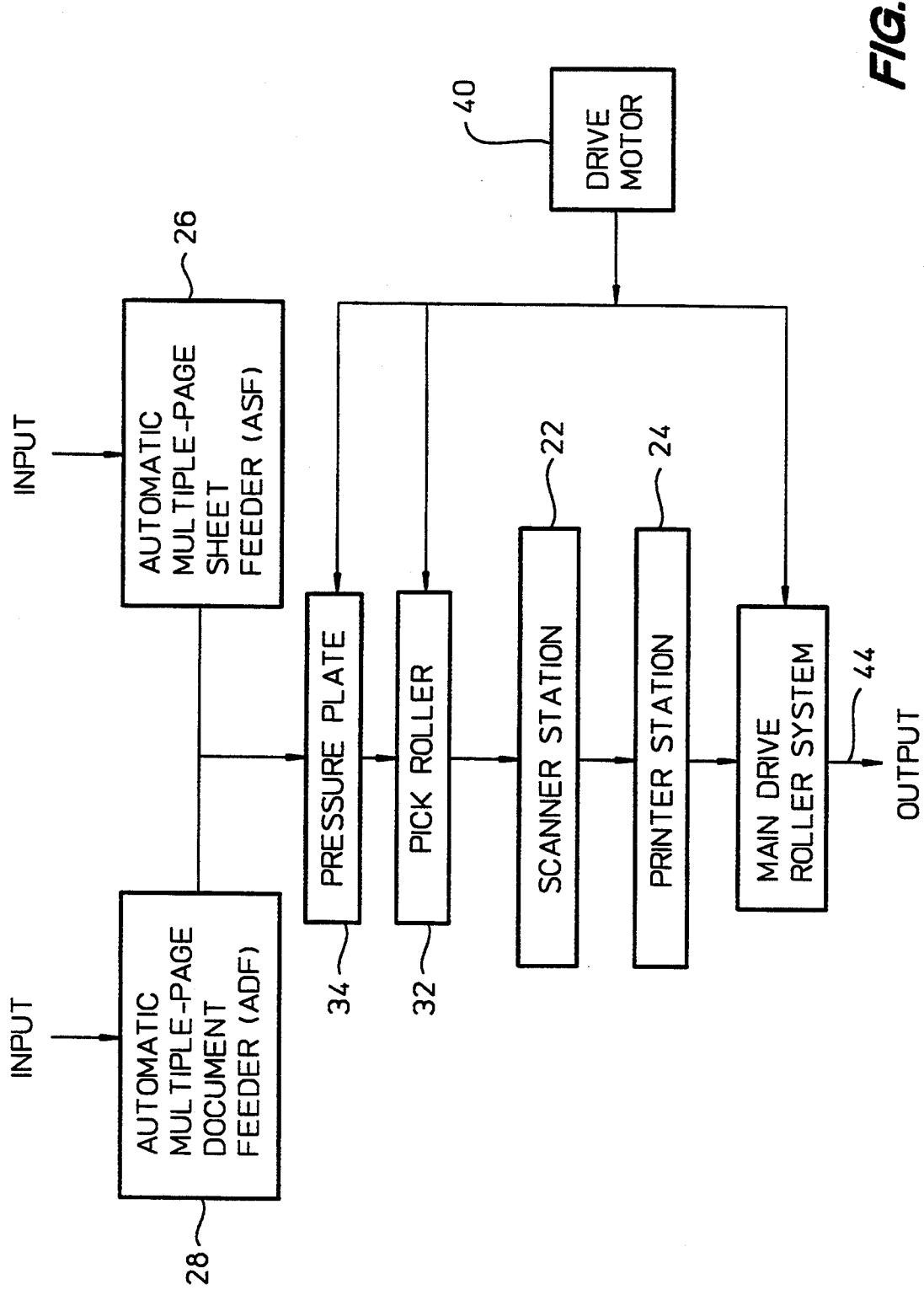
FIG. 2 is a functional block diagram of the embodiment of FIG. 1.
Figure 8:
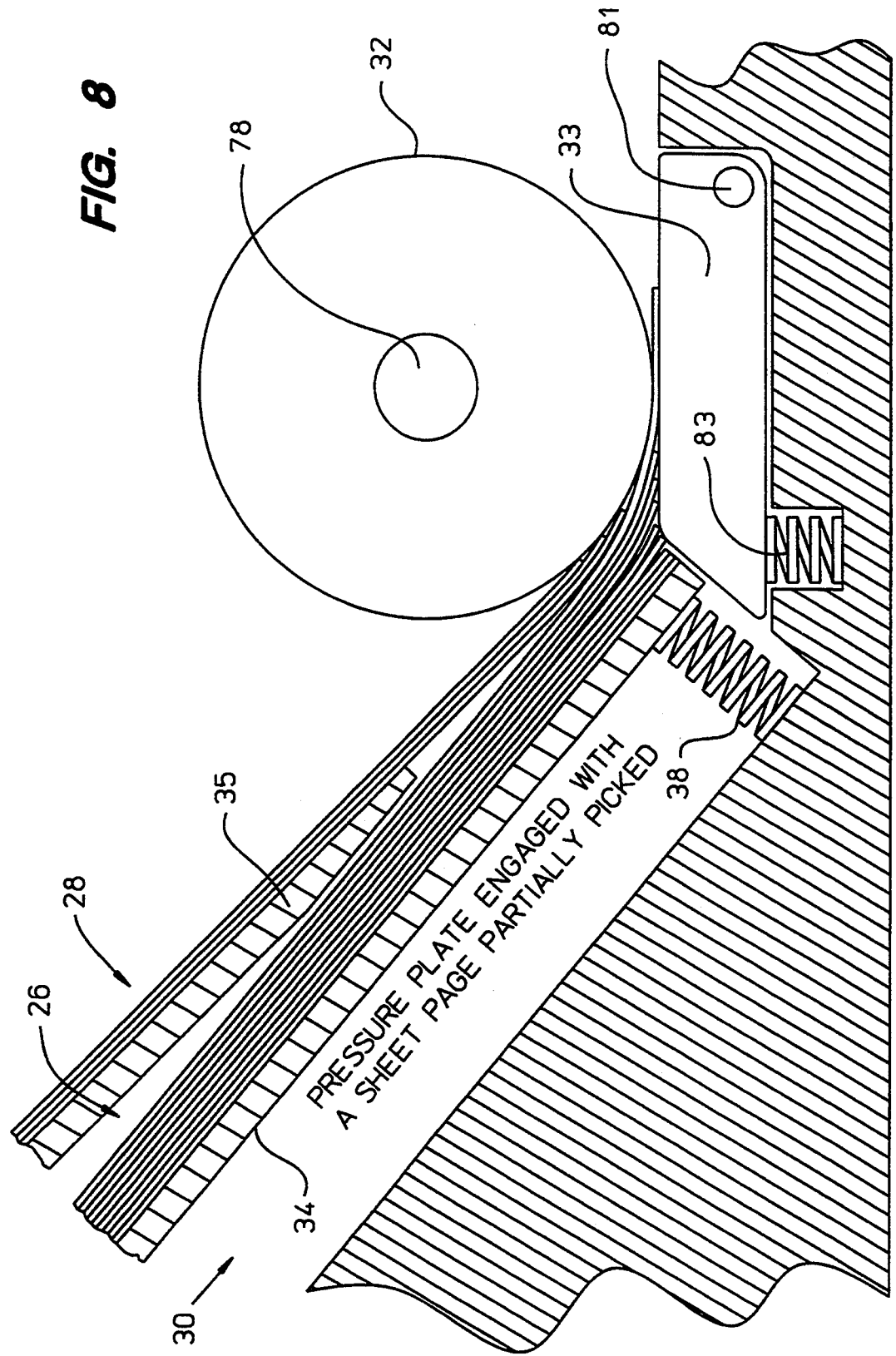
FIG. 8 is a close-up schematic showing a pick roller ready to begin a reverse rotation kicking partially picked sheet(s) backward into the ASF as a result of a document stack being inserted into the ADF.
Figure 9:
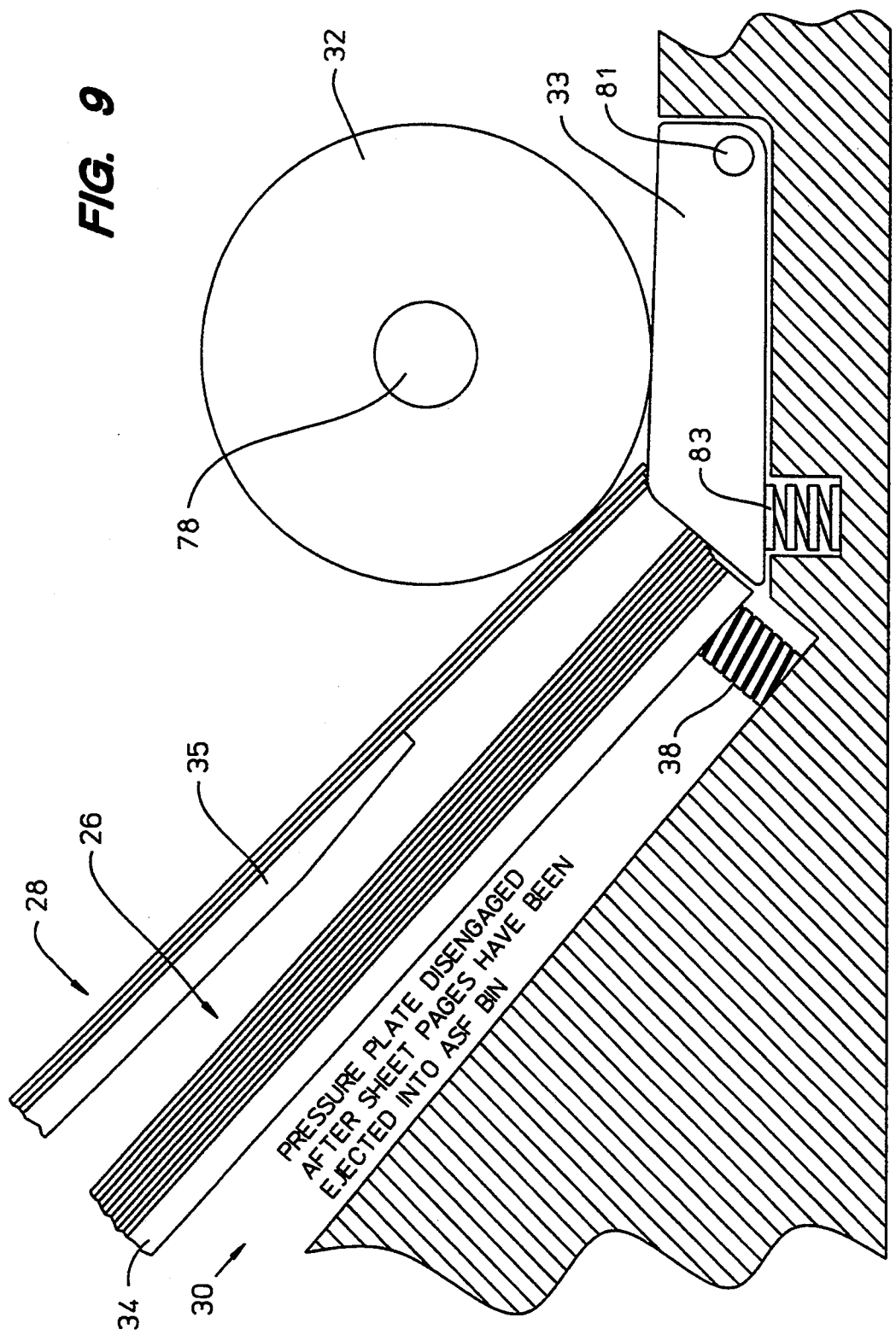
FIG. 9 is a close-up schematic showing the pressure plate in disengaged position and all of the partially picked sheets expelled from underneath the pick roller into the ASF.
Figure 10:
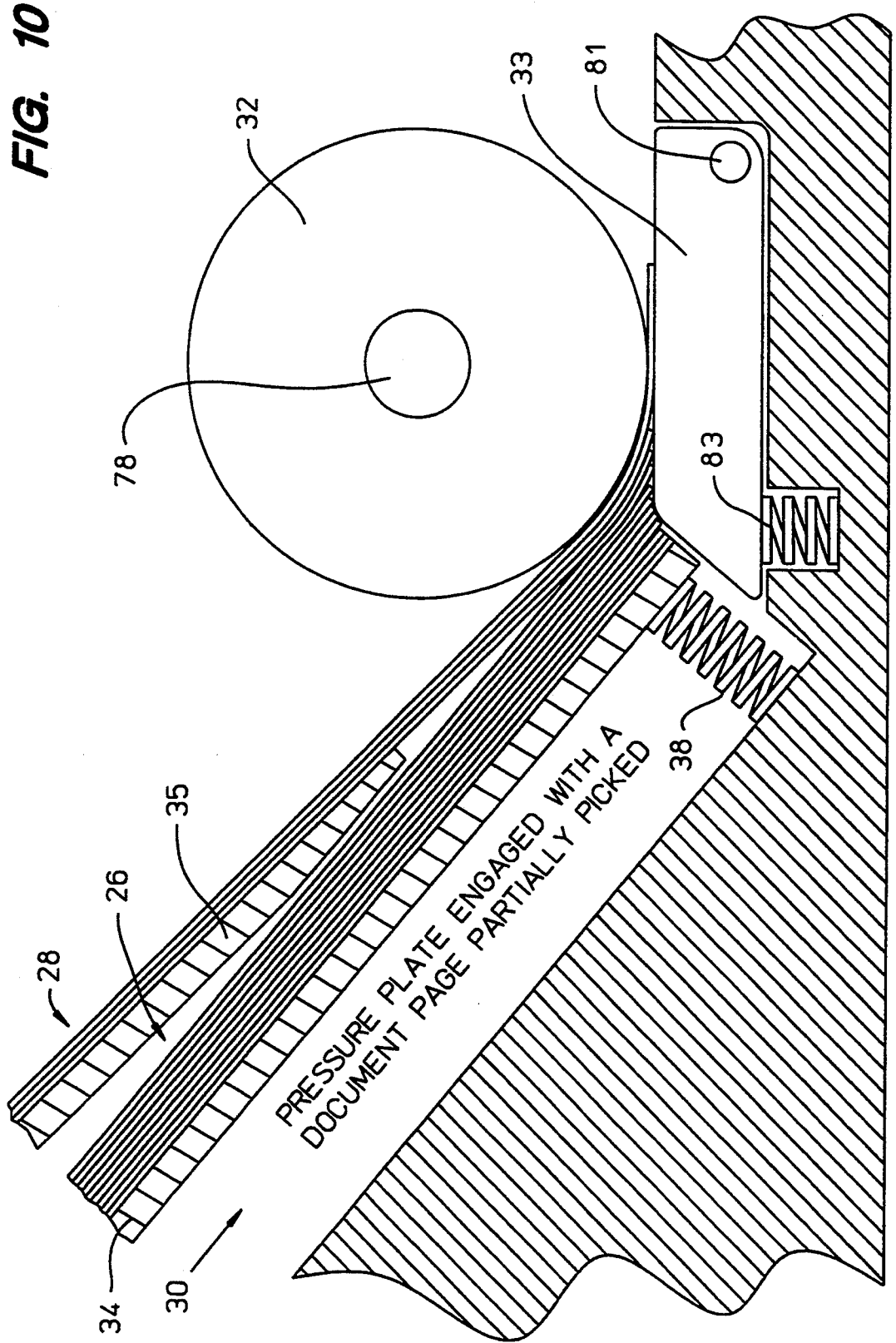
FIG. 10 is a close-up schematic showing the pressure plate returned to an engaged position with the pick roller already commencing to pick a page from the top of the stack of documents which now partially overly the stack of print sheets.

Referring more particularly to FIGS. 1-2, the multiple-function device of the presently preferred embodiment includes a frame 20 for housing a scanner station 22 and a printer station 24. A stack of print sheets is loadable into an automatic sheet feeder (ASF) 26, and a stack of documents having text/graphics to be scanned is loadable into an automatic document feeder (ADF) 28 which together form a common input feeder slot 30 having a pick roller 32 and a spring-loaded stripper pad 33 at the lower end. The upper portion of the input feeder slot which constitutes the ADF is separated from the ASF by a divider 35. The divider is truncated at its lower end to allow document stacks and sheets stacks to converge at the pick roller (see FIGS. 8-10). A pressure plate 34 is attached at its upper end through pivot pin 36 to the frame and is normally biased upwardly against the pick roller by springs 38. A drive motor 40 is connected through a gear mechanism to the pressure plate 34 and pick roller 32 as described in more detail hereinafter, and is also connected to a main drive roller 42 which pulls the pages through the processing stations for either scanning or printing. The printout pages as well as the scanned pages pass across an output roller 43 to be deposited in a common output area 44.

The scanner and printer stations in the drawings are for purposes of illustration only and are of conventional design, except for their unique locations along a shared path using shared mechanisms. In that regard, scanner station 22 includes a lamp 46 for illuminating a scanning zone, reflective mirrors 48, 50, a lens 49, and a CCD (charge-coupled device) photosensor 51. Printer station 24 includes inkjet cartridge 52 which rides on a slider rod 54 back and forth across a print zone.

Figure 11:
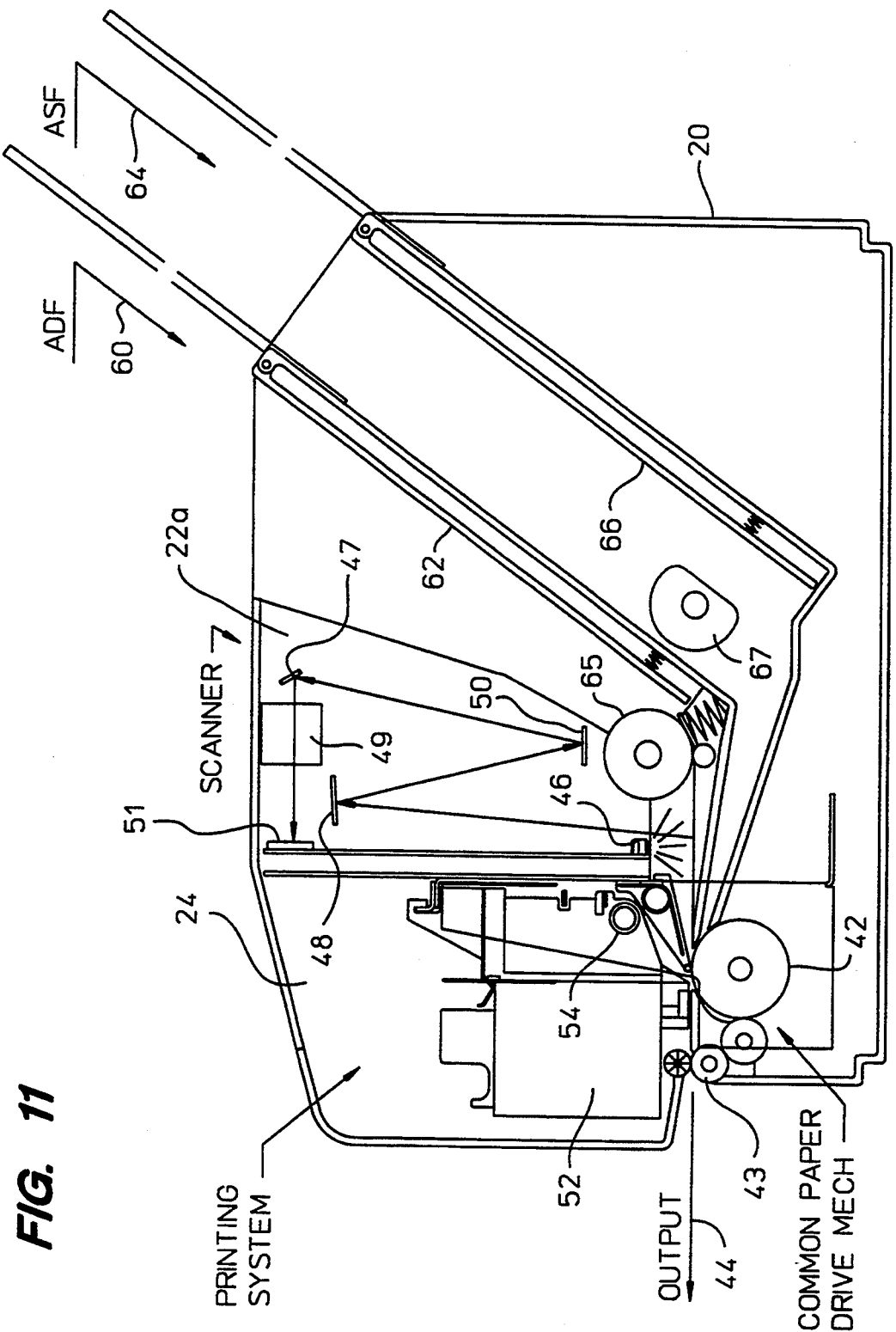
FIG. 11 is a schematic side view of an alternate printer/facsimile embodiment of the present invention.
Figure 12:
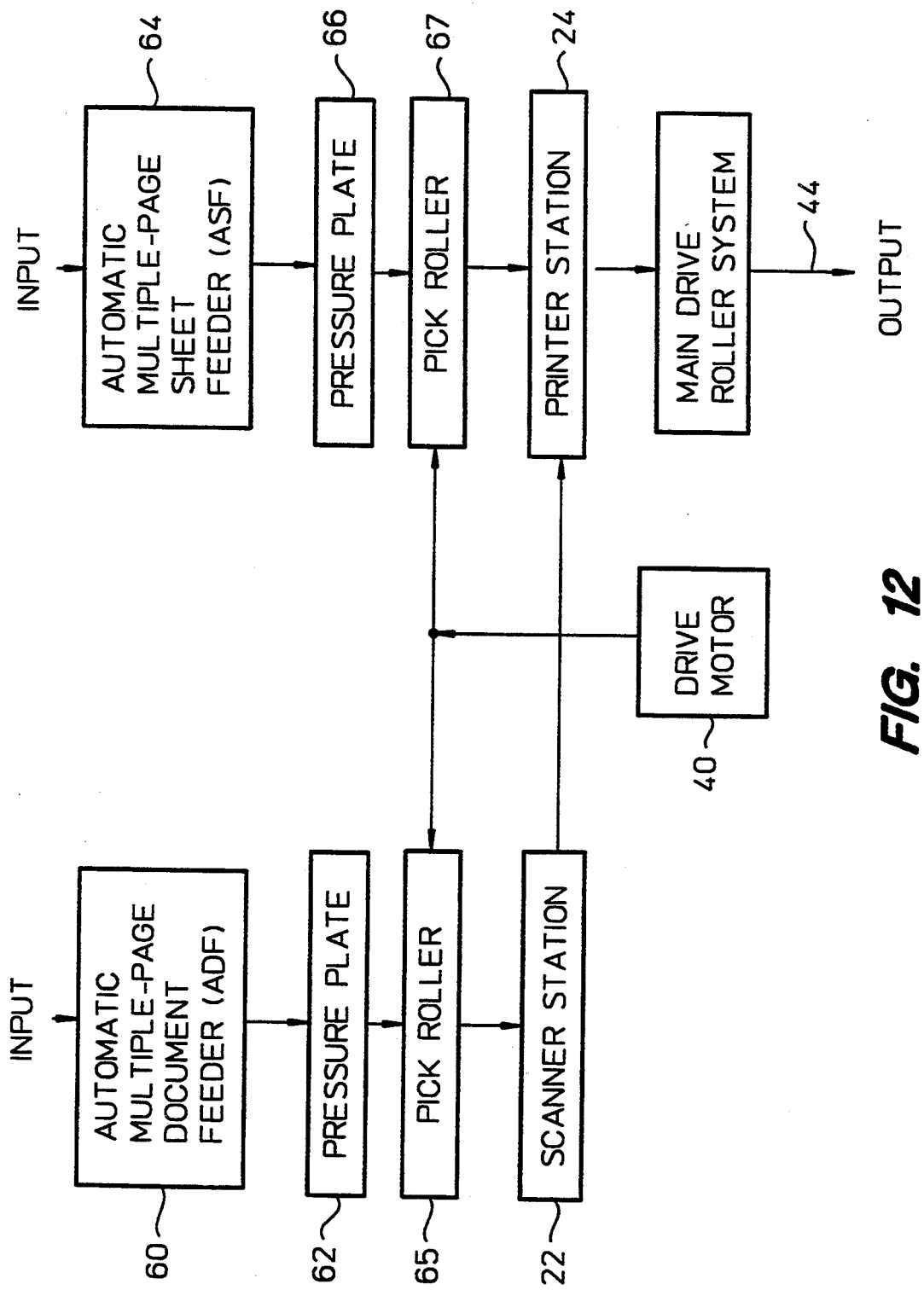
FIG. 12 is a functional block diagram of the embodiment of FIG. 11.

In the alternate embodiment of FIGS. 11-12, the common document/sheet path and shared mechanisms are similar to FIGS. 1-2 and include scanner station 22a, printer station 24, drive motor 40, main drive roller 42, output roller 43 and a shared output 44 wherein document pages proceed actively through the scanner station and passively through the printer station, and printout sheet pages bypass the scanner station and proceed actively through the printer station, both to a common output. However, ADF 60 has its own pivotally mounted spring-loaded pressure plate 62 to facilitate reliable page feeding to document pick roller 63, and ASF 64 has its own pivotally mounted spring-loaded pressure plate 66 to facilitate reliable page feeding to sheet pick roller 67, with both pick rollers 65, 67 being driven by the drive motor 40.

Figure 13:
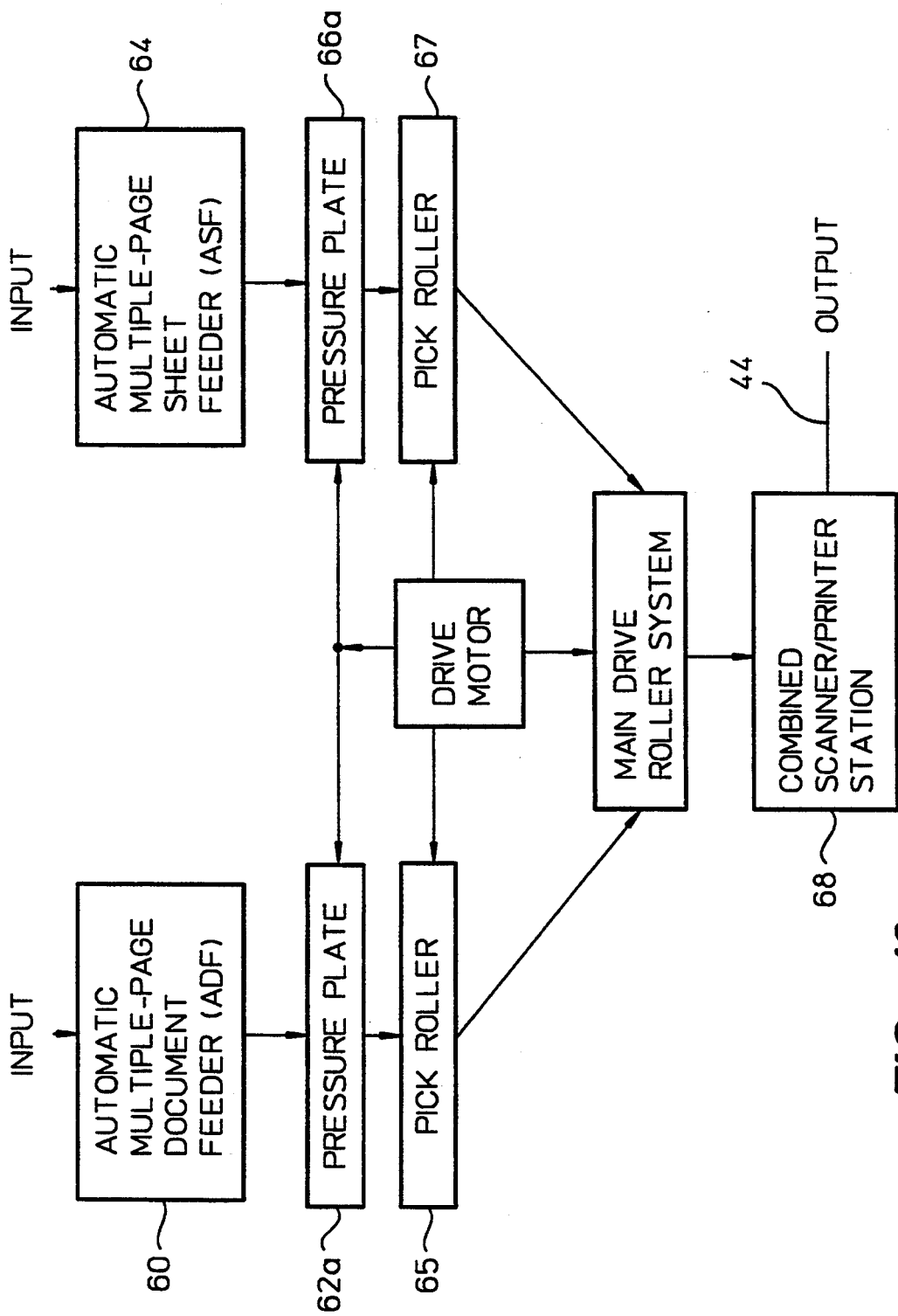
FIG. 13 is a functional block diagram of another alternate printer/facsimile embodiment of the present invention.

In another alternate embodiment of FIG. 13, the common document/sheet path and shared mechanisms are similar to FIGS. 11-12. But this alternate embodiment provides a common path through a combined scanner/printer station 68 to a common output 44, with separate pick rollers 65, 67 and separate pressure plates 62a, 66a driven by the drive motor 40 for the main drive roller system.

Referring now to FIGS. 3-6 which show further details of the preferred embodiment of FIGS. 1-2, the input feeder slot is integrated into the device so that when the unit is resting with its feet 69 on a desk top, stacks of sheets or documents can be added without having to remove any tray. Since the frame is supported by legs 71 so that the input feeder slot is angled downwardly, both of the stacks naturally settle to the bottom of the slot so that the leading edges of pages on top of the stacks will impinge against the pick roller (see FIGS. 8-10). The action of the pressure plate against both stacks assures proper separation by the spring-loaded stripper pad 33 in combination with the rotation of the pick roller 32.

The ADF includes an extender 70 mounted on the upper end of the divider 35 which pivots forwardly out of the way when pages are added or removed from the ASF. The ASF is sandwiched between the ADF and the bottom of the feeder slot and includes its own extender 72 as well as a single adjustable guide 74 for maintaining the sheet stack in proper positioning for feeding into the pick roller.

It will be understood by those skilled in the art that proper feeding/picking of pages from a large quantity stack of virginal printing paper in the ASF is a somewhat easier task than proper feeding/picking of variously sized partially bent pages of stacked documents in the ADF having text/graphics thereon. Therefore the ADF is positioned above the ASF for better picking by the pick roller and easier access for accurate and proper loading between dual adjustable guides 76. The automatic action of the pressure plate 34 as described in more detail hereinafter also helps to assure proper feeding of pages from the ASF for printing or pages from the ADF for scanning.

The pick roller 32 is mounted on a pick shaft 78 which has a pair of guide rollers 80 also mounted thereon in the commonly shared paper path, as well as a double-pin delay coupler 81 mounted on the shaft end outside the frame. The guide rollers 80 and matching pinch rollers 82 help to hold the pages in proper position as they move past the pick roller to the scanning and printing stations.

Figure 3:
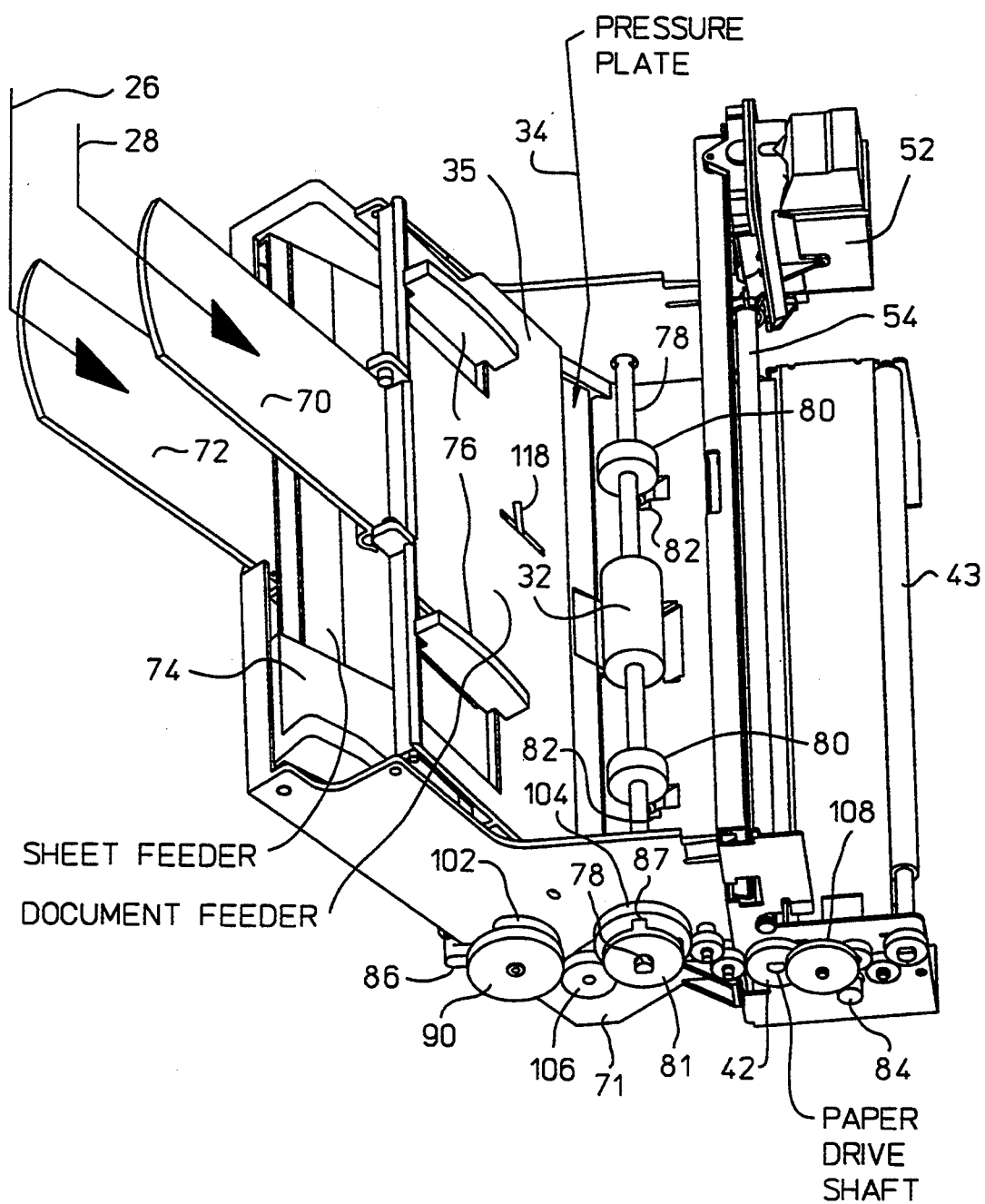
FIG. 3 is an isometric view looking down into an implementation of the embodiment of FIG. 1.
Figure 4:
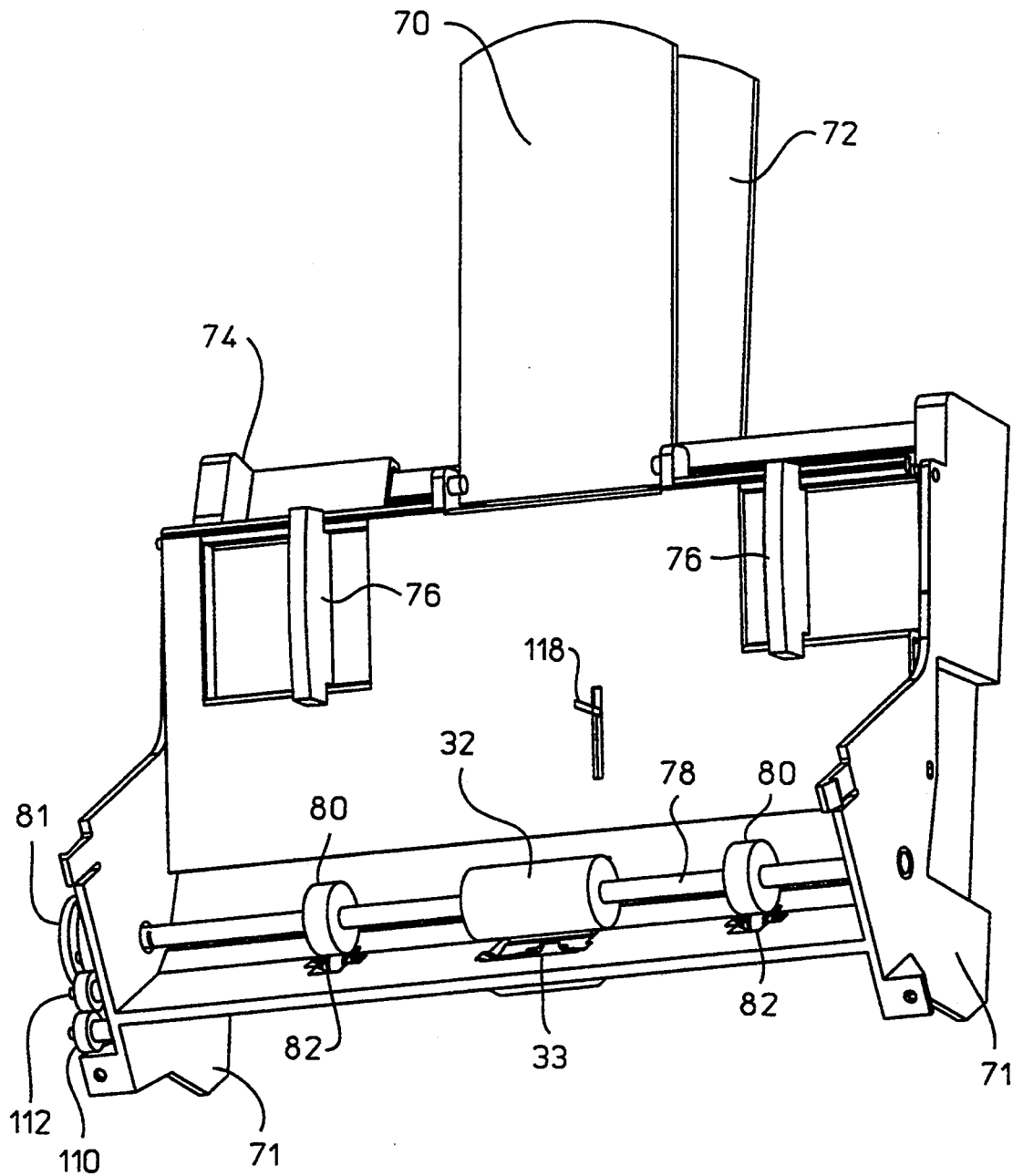
FIG. 4 is a fragmentary isometric view showing the input feeder slots and pick roller portion of FIG. 3.
Figure 5:
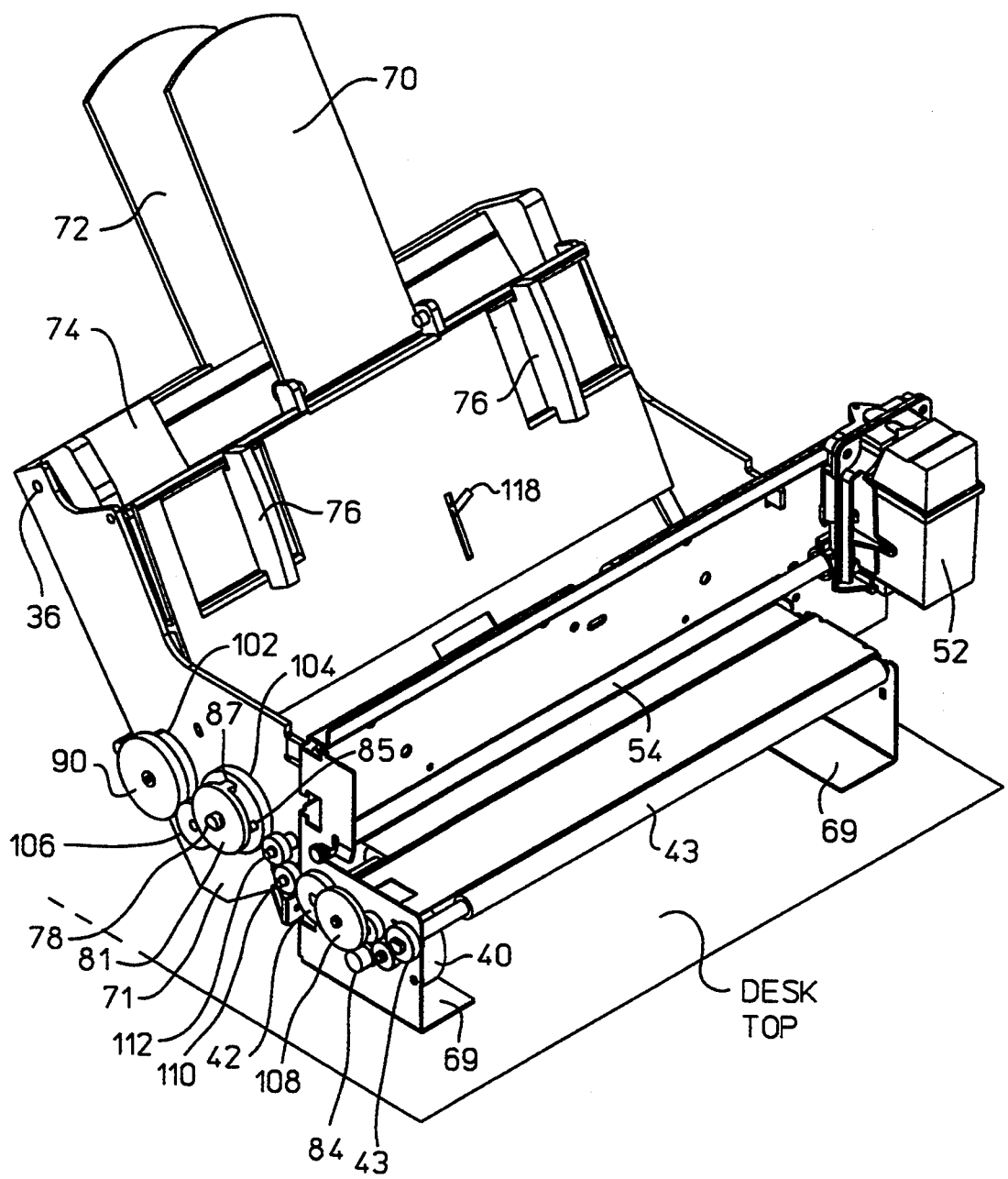
FIG. 5 is a front isometric view of FIG. 3.
Figure 6:
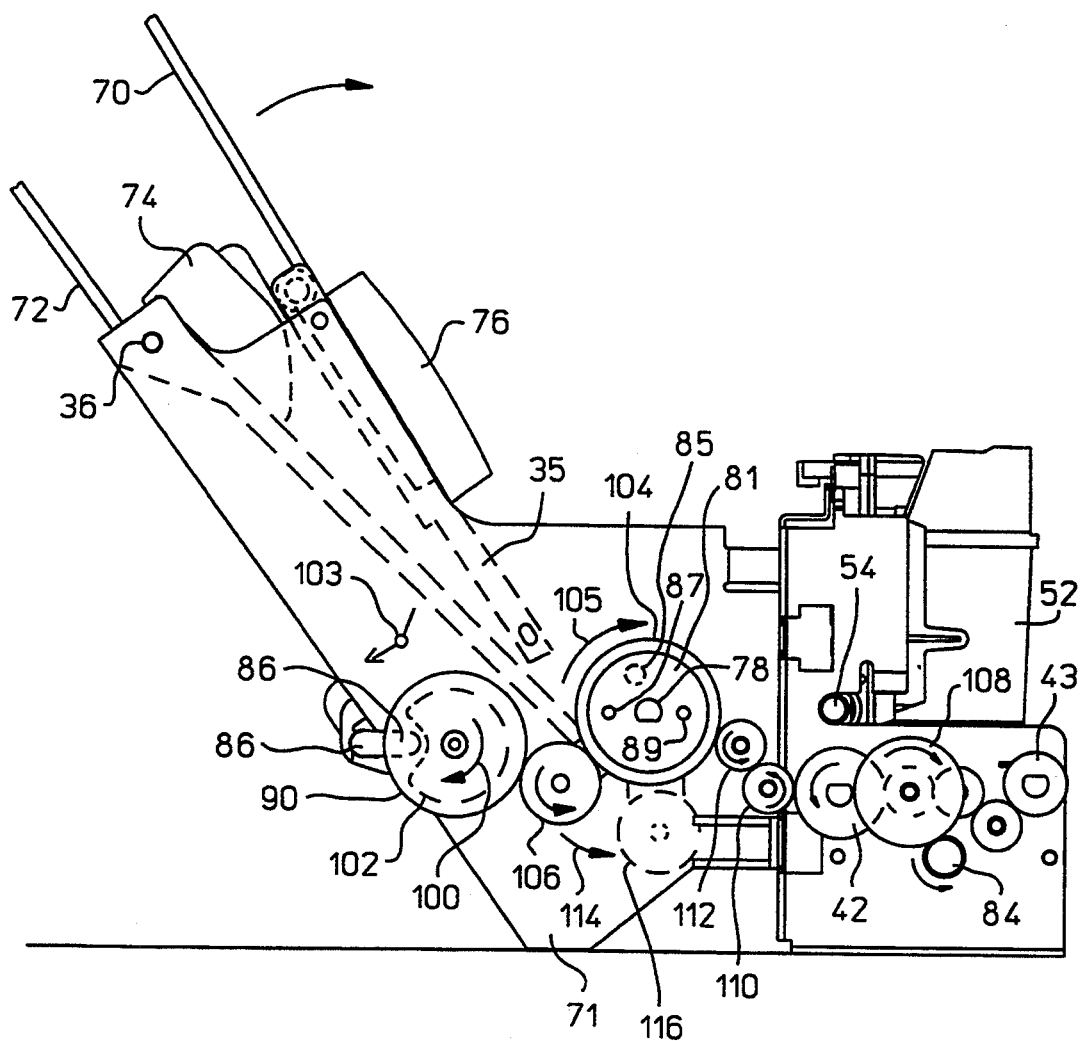
FIG. 6 is a side view of FIG. 3.
Figure 7:
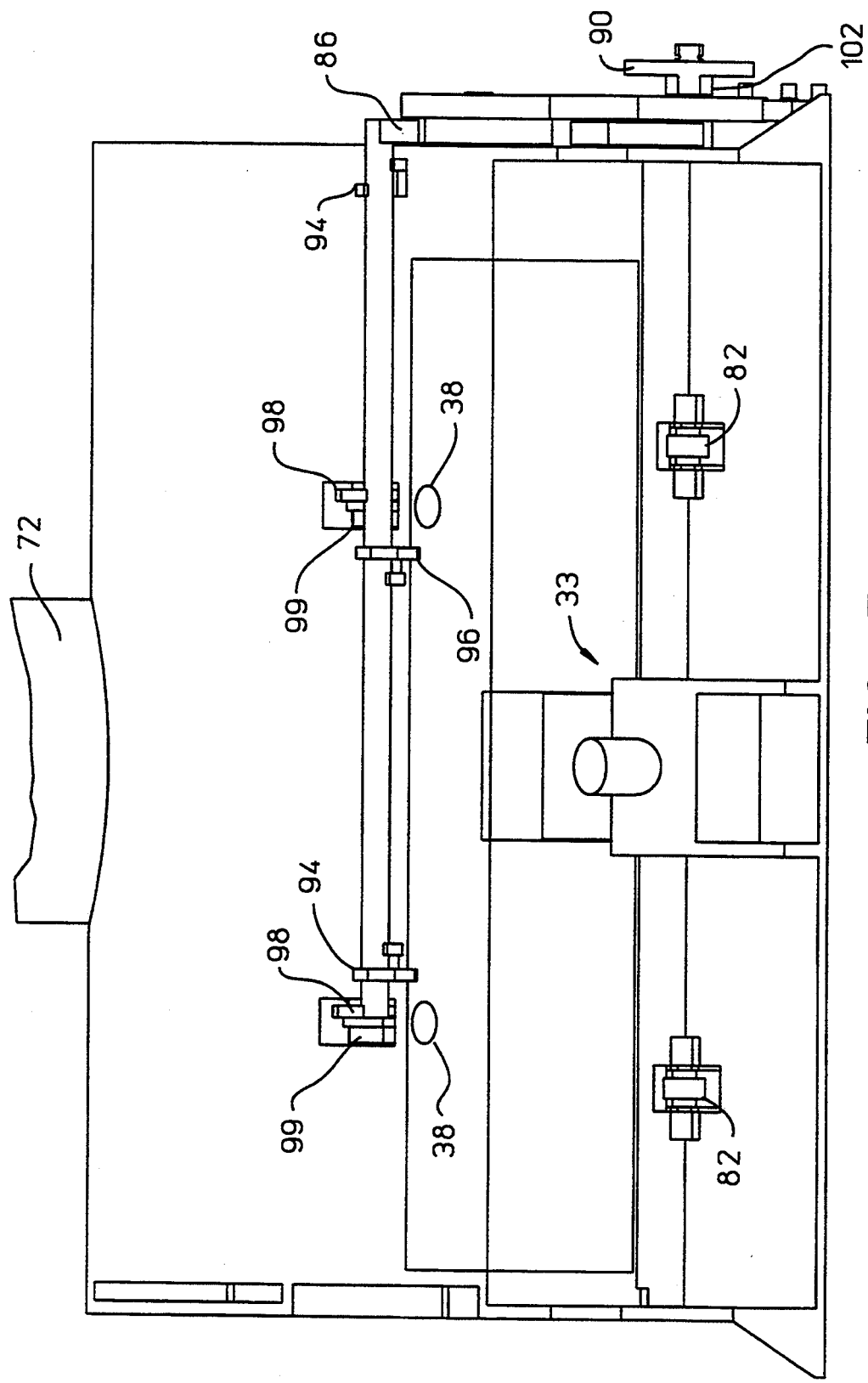
FIG. 7 is a fragmentary back view looking up at the feeder slots and pick roller portion of FIG. 4.

A unique gear mechanism is shown in FIGS. 3 and 6-7 for automatically moving the pressure plate to and fro between a disengaged position "open" position and an engaged "closed" position. The disengaged open position allows access to the stacks for removal, replenishment, or replacement of pages as well as for realignment of the stacks between one or more page picking events if that is deemed to be desirable and necessary to avoid misfeeds. More importantly from a multiple-function point of view (see FIGS. 8-10), the disengaged open position allows new pages of documents to be placed in the ADF with their leading edges resting on top of the sheet stack in the ASF, thereby preparing for a scanning operation to commence.

The engaged closed position holds the sheet stack in aligned position together as a unit if there are not any documents in the ADF. This helps to prevent more than one page from being accidently picked. The engaged closed position holds the document stack in aligned position together as a unit if there are not any sheets in the ASF. If there is already a stack of sheets in the ASF and some additional document pages have been added to the ADF, then the engaged closed position holds both the document stack and the underlying sheet stack in aligned position together as a composite stack insofar as their leading edges are concerned.

FIG. 6 shows the gear mechanism in a "start disengagement" position, with motor drive gear 84 moving in reverse direction to cause main drive roller 42 to also go in reverse. Coupling pin 85 on linkage gear 104 is partway between forward direction coupling pin 87 and rearward direction coupling pin 89 on delay coupler 81. This assures that commencing the reverse driving of the pick roller to expel partially picked pages does not occur until after the pressure plate has been moved into disengagement position.

Cam follower 86 is resting in a notch on cam 88 which is rigidly mounted for turning with pressure plate gear 90. So long as cam follower 86 remains in the notch, the pressure plate remains in closed engagement position. The connection between cam follower 86 and the pressure plate is best shown in FIG. 7. The cam follower 86 is mounted on the end of a pivot rod 92 which is mounted for pivotal rotation by a pair of brackets 94 and a counter-bracket 96. A pair of fingers 98 are also mounted on pivot rod 92 and interconnect with matching slots 99 so that when the pressure plate gear 90 is rotated in direction 100, the cam follower is forced to pivot upwardly into "disengagement position" and ride along the larger diameter surface 102. This makes the entire pivot rod 92 rotate and causes the fingers 90 to pivot the pressure plate in direction 103 into a completely retracted position of disengagement in a direction away from the pick roller 32. When the pressure plate 90 has made a complete rotation, the cam follower rides back down into the notch, thereby allowing the pressure plate to return to an "engagement position".

A linkage gear 104 is slidably mounted on the pick shaft 78 to couple the drive motor 40 to the pressure plate gear 90, and also to couple the drive motor 40 through the double-pin delay coupler 81 to the pick roller. When the motor drive gear 84 is in reverse, the linkage gear rotates in direction 105 to move its attached transfer gear 106 into link position with the pressure plate gear 86. Thus the coupling from drive motor 40 to the pressure plate gear 90 is through double-wheel gear 108, main drive gear 42, spur gears 110, 112, linkage gear 104, and transfer gear 106. Decoupling occurs when the motor drive gear 84 changes back to forward, since this changes the rotation direction of linkage gear 104 and moves transfer gear 106 in the direction 114 to a non-link position 116. The foregoing gear/cam mechanism provides for automatic movement of the pressure plate between a position of engagement of the stacks with the pick roller and a position of disengagement. This necessarily occurs after a page being processed at the scanning station or the printing station has passed by the main drive roller 42 and the output roller 43 to the common output area 44.

The initiation of the dis-engagement can be programmed to occur at predetermined times such as before every picking step, or whenever a mis-feed occurs, or the like. Also, when a document page is placed in the ADF, it pushes down sensor 118 to activate the aforementioned dis-engagement sequence of steps.

As best shown in FIG. 6, the delayed contact of the pin 85 on linkage gear 104 with double-pin delay coupler 81 causes the reversing of the pick roller expelling any pages from a previous picking step to occur after the pressure plate has moved to a position of dis-engagement.

As best shown in FIGS. 6, the gearing mechanism is designed to automatically provide a delay between the picking of successive pages from the sheet stack or document stack. In that regard, the gearing ratios provide for output roller 43 to rotate faster than main drive roller 42 which rotates faster than pick roller 32. The speed differential between the output roller 43 and the main drive roller 42 keeps a page in tension as it passed through the printing station, the scanning station, or the combined printing/scanning station.

The linkage gear 104 has its single pin 85 which engages one or the other of the two pins 87, 89 on the delay coupler 81 (depending on the direction of the main drive) to drive the pick roller forwardly or rearwardly with a partial revolution delay for driving the pick roller when a directional change occurs. This relationship between the linkage gear 104 and the delay coupler 81, when combined with the speed differential between the pick roller 32 and the main drive roller 42, provides for the pin on the linkage gear 104 to walk away from engagement of the pin on the delay coupler so long as a page is in driving engagement with both the pick roller and the main drive roller. In other words, during that double driving period, the pick roller is slaved to the paper and rotates faster than the linkage gear to cause the aforesaid "walk away".

When the trailing edge of the page finally leaves the pick roller, the pick roller shaft and the delay coupler mounted thereon stop, and the time it takes for the pin on the linkage gear to rotate into engagement with the pin on the delay coupler is the "delay time" which occurs between the picking of successive pages from the stack.

Thus, the aforementioned features of the present invention provide for automated operation of a printing station, scanning station or the like from a single drive motor through a gear mechanism which provides spaced-apart picking of successive pages from an input feed stack. These aforementioned features also provide for the shared use of a paper path and mechanisms which are involved along the path by a multiple-function device which employs operations such as printing, scanning and the like in the same machine.

Of course, it is to be understood that the aforementioned features are also useful in single function devices as well as in multiple-function devices which may or may not have some shared path and mechanisms.

While specific illustrated embodiments have been shown and described, it will be appreciated by those skilled in the art that various modifications, changes and additions can be made to the methods, structures and apparatus of the invention without departing from the spirit and scope of the invention as set forth in the following claims.

I claim as my invention:

1. A hardcopy device for feeding pages from a stack of sheets or documents into a paper path for processing by the hardcopy device, comprising:
    an input feeder integrated into the hardcopy device for holding the stack in an angled position with a leading edge of the pages at a lower position than a trailing edge of the pages;
    pick means in close proximity to said input feeder;
    pressure plate means movably attached to said input feeder; and
    a single drive motor coupled through a gear mechanism to said pick means and said pressure plate means, for driving said pick means at a predetermined rate as well as for moving said pressure plate means between an engagement position during the picking of a page and a dis-engagement position.

2. The hardcopy device of claim 1 wherein said single drive motor is coupled through said gear mechanism to said pressure plate means for moving said pressure plate means into the dis-engagement position between picking of successive pages from the stack.

3. The hardcopy device of claim 1 wherein said single drive motor is coupled through said gear mechanism to said single pressure plate feeder means for moving said pressure plate means into the dis-engagement position when adding additional pages to said sheet feeder.

4. The hardcopy device of claim 1 which further includes delay means coupled with said single drive motor and said pick means, for spacing apart successive pages which are picked from said stack of documents or sheets.

5. The hardcopy device of claim 1 which constitutes a printer, wherein said input feeder holds a stack of sheets to be printed, and which further includes main drive roller means for moving the pages past a printing zone, said main drive roller means coupled with said single drive motor.

6. The hardcopy device of claim 5, wherein said hardcopy device constitutes an inkjet printer.

7. The hardcopy device of claim 1 which constitutes a facsimile device, wherein said input feeder holds a stack of sheets to be printed, and which further includes main drive roller means for moving the pages past a printing zone, said main drive roller means coupled with said single drive motor.

8. The hardcopy device of claim 7, wherein said facsimile device includes an inkjet printer.

9. The hardcopy device of claim 1 which constitutes a facsimile device, wherein said input feeder holds a stack of documents to be scanned, and which further includes main drive roller means for moving the pages past a scanning zone, said main drive roller means coupled with said single drive motor.

10. The hardcopy device of claim 1 which further includes first control means selectively coupled between said single drive motor and said pressure plate to move said pressure plate from a position of engagement for holding said stack against said pick means to a position of dis-engagement to allow said stack to move away from said pick means.

11. The hardcopy device of claim 1 which further includes second control means coupled to said pick means to reverse the direction of said pick means to expel any residual sheets remaining from the printing operation.

12. The hardcopy device of claim 10 which further includes second control means coupled to said pick means to reverse the direction of said pick means after the disengagement of said pick means to expel any residual sheets remaining from the printing operation.

13. The hardcopy device of claim 1 which further includes:
a main drive roller;
wherein said pick means includes a pick roller:
wherein said gear mechanism is coupled between said single drive motor and said pick roller to drive said pick roller at a first rate; and
wherein said gear mechanism is coupled between said single drive motor and said main drive roller to drive said main drive roller at a second rate faster than said first rate.

14. The hardcopy device of claim 13 which further includes an output roller, wherein said gear mechanism is coupled between said single drive motor and said output roller to drive said output roller at a third rate faster than said second rate.

15. The hardcopy device of claim 13 wherein said gear mechanism includes delay means for spacing apart successive pages which are picked from said stack by said pick roller.

16. The hardcopy device of claim 1 wherein said input feeder includes a feeder slot integrated into the multiple-function device for manual loading of the stack of sheets without having to remove any feeder tray.

17. A method of processing pages in a hardcopy device, comprising the steps of:
holding a stack of pages in an input feeder;
maintaining engagement of the stack of pages with a pick device while processing the pages by putting a spring-loaded pressure plate in engaged position;
moving automatically the pressure plate from the engaged position to a dis-engaged position;
repositioning automatically the pressure plate to re-engage the remaining stack of pages with the pick device;
maintaining engagement of the remaining stack of pages with the pick device while processing successive pages; and
commencing automatically the picking of each successive page after a predetermined time interval has elapsed to provide spaced-apart pages passing through the hardcopy device.

18. The method of claim 17 which further includes after said moving step the additional step of placing additional pages on the existing stack without removing the existing stack, such that said repositioning step includes applying pressure through the existing stack to the additional pages, with all the remaining pages forming a composite stack.

19. The method of claim 17 wherein said moving step includes moving the pressure plate from the engaged position to a dis- engaged position for re-alignment of the pages in the existing stack prior to said repositioning step.

20. The method of claim 17 wherein said moving step includes moving the pressure plate from the engaged position to a disengaged position for replenishment of the pages in the existing stack prior to said repositioning step.

* * * * *